United States Patent
Cao et al.

(10) Patent No.: US 8,478,123 B2
(45) Date of Patent: Jul. 2, 2013

(54) IMAGING DEVICES HAVING ARRAYS OF IMAGE SENSORS AND LENSES WITH MULTIPLE APERTURE SIZES

(75) Inventors: Dongqing Cao, San Jose, CA (US); Qun Sun, San Jose, CA (US); Juanqing Chen, San Jose, CA (US)

(73) Assignee: Aptina Imaging Corporation, George Town (KY)

( * ) Notice: Subject to any disclaimer, the term of this patent is extended or adjusted under 35 U.S.C. 154(b) by 64 days.

(21) Appl. No.: 13/108,727

(22) Filed: May 16, 2011

(65) Prior Publication Data

US 2012/0189293 A1    Jul. 26, 2012

Related U.S. Application Data (60) Provisional application No. 61/435,916, filed on Jan. 25, 2011.

(51) Int. Cl.
*G03B 41/00* (2006.01)
*H04N 13/02* (2006.01)
*H04N 5/225* (2006.01)
*H01L 25/00* (2006.01)

(52) U.S. Cl.
USPC .............................. 396/333; 348/49; 250/332

(58) Field of Classification Search
USPC ............... 396/333, 322, 9, 10, 325, 335, 661; 348/218.1, 340, 342, 272, 273, 42, 47, 48, 348/49; 250/559.46, 332, 339.02, 208.1
See application file for complete search history.

(56) References Cited

U.S. PATENT DOCUMENTS

| | | | |
|---|---|---|---|
| 5,727,242 | A | 3/1998 | Lo et al. |
| 6,278,847 | B1 | 8/2001 | Gharib et al. |
| 2004/0218291 | A1 | 11/2004 | Fiete |
| 2007/0177004 | A1 * | 8/2007 | Kolehmainen et al. ......... 348/42 |
| 2008/0225420 | A1 | 9/2008 | Barrows et al. |

OTHER PUBLICATIONS

A. Portnoy et al., "Design and characterization of thin multiple aperture infrared cameras", Applied Optics, Apr. 10, 2009, vol. 48, No. 11.

* cited by examiner

*Primary Examiner* — Rochelle-Ann J Blackman
(74) *Attorney, Agent, or Firm* — Treyz Law Group; Louis R. Levenson (57) ABSTRACT

An array camera may be formed from an array of lenses, an array of corresponding apertures, and an array of corresponding image sensors. The array of apertures may be configured so that some image sensors receive light through apertures of different size than other image sensors. Providing apertures of smaller size increases the F/# of an array camera and increases the depth-of-field in a captured image. The array of image sensors may include a near-infrared image sensor. Providing an image sensor array with a near-infrared image sensor may enhance depth information in captured images or increase night vision capabilities of an array camera. Combining an array of image sensors that includes a near-infrared sensor with an array of apertures having different aperture diameters may allow increased depth-of-field imaging, enhanced extraction of depth information from an image, improved night vision, enhanced image clarity or other improvements.

20 Claims, 7 Drawing Sheets

IMAGING DEVICES HAVING ARRAYS OF IMAGE SENSORS AND LENSES WITH MULTIPLE APERTURE SIZES

This application claims the benefit of provisional patent application No. 61/435,916, filed Jan. 25, 2011, which is hereby incorporated by reference herein in its entirety.

BACKGROUND

This relates generally to imaging devices, and more particularly, to imaging devices with multiple lenses and image sensors.

Image sensors are commonly used in electronic devices such as cellular telephones, cameras, and computers to capture images. In a typical arrangement, an electronic device is provided with a single image sensor and a single corresponding lens. Some electronic devices use arrays of image sensors and corresponding lenses to gather image data. This type of system, which is sometimes referred to as an array camera, may be used to extend depth of focus, increase output resolution through super-resolution processing, and capture depth information from a scene. Array cameras may also be used to improve image processing and information gathering processes such as gesture control, image segmentation or other image processing operations.

In a conventional array camera, image sensors associated with red, green, and blue color filters are used along with corresponding lenses having equal sized apertures. Array cameras having red, green and blue color image sensors with equal sized apertures have certain depth of focus that is determined by the aperture size. Reducing the aperture size increases the range of depth of focus. However, reducing all aperture sizes may have undesired consequences such as reduced sensitivity and reduced signal to noise ratio.

It would therefore be desirable to be able to provide improved imaging devices with array cameras with multiple aperture sizes.

DETAILED DESCRIPTION

Digital camera modules are widely used in electronic devices such as digital cameras, computers, cellular telephones, or other electronic devices. These electronic devices may include image sensors that gather incoming light to capture an image. The image sensors may include arrays of image pixels. The pixels in the image sensors may include photosensitive elements such as photodiodes that convert the incoming light into digital data. Image sensors may have any number of pixels (e.g., hundreds or thousands or more). A typical image sensor may, for example, have hundreds of thousands or millions of pixels (e.g., megapixels).

Figure 1:
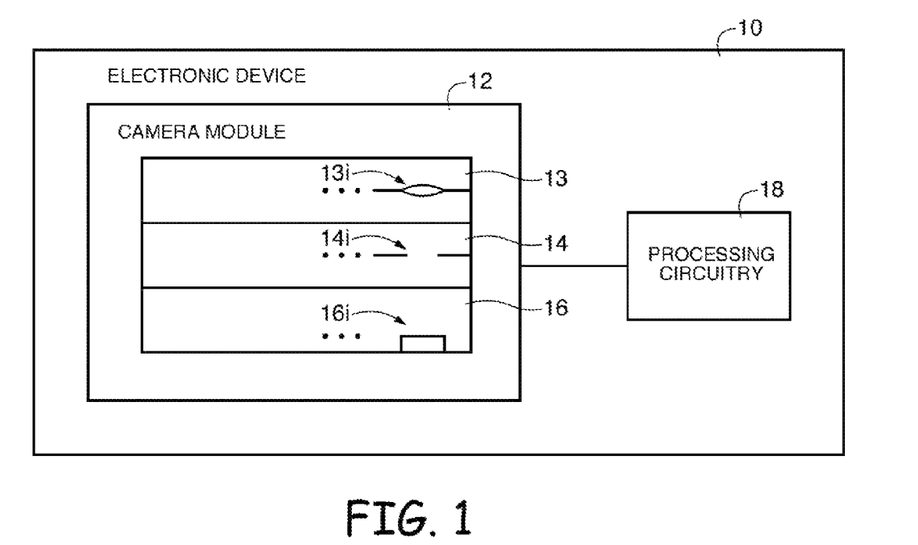
FIG. 1 is a diagram of an illustrative electronic device having an array of apertures in accordance with an embodiment of the present invention.

FIG. 1 is a diagram of an illustrative electronic device that uses an image sensor to capture images. Electronic device 10 of FIG. 1 may be a portable electronic device such as a camera, a cellular telephone, a video camera, or other imaging device that captures digital image data. Camera module 12 may be used to convert incoming light into digital image data. Camera module 12 may include an array of lenses 13, a corresponding array of apertures 14, and a corresponding array of image sensors 16. Lens array 13 and image sensor array 16 may be mounted in a common package and may provide image data to processing circuitry 18. Processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18. Processed image data may, if desired, be provided to external equipment (e.g., a computer or other device) using wired and/or wireless communications paths coupled to processing circuitry 18.

There may be any suitable number of lenses 13$i$ in lens array 13, any suitable number of apertures 14$i$ in aperture array 14, and any suitable number of image sensors 16$i$ in image sensor array 16. Lens array 13 may, as an example, include N*M individual lenses arranged in an N×M two-dimensional array. The values of N and M may be equal to or greater than one, may be equal to or greater than two, may exceed 10, or may have any other suitable values. The physical size of each lens 13$i$ in lens array 13 may be substantially different from the physical size of any other lens in lens array 13 or may be substantially the same as the size of other lenses in lens array 13. Each image sensor 16$i$ and lens 13$i$ may have an associated aperture 14$i$. The aperture 14$i$ (sometimes called a lens aperture) associated with each image sensor 16$i$ may have a different size than that of other apertures in aperture array 14 or may have the same size as other apertures in aperture array 14.

Image sensor array 16 may contain a corresponding N×M two-dimensional array of individual image sensors. The image sensors may be formed on one or more separate semiconductor substrates. With one suitable arrangement, which is sometimes described herein as an example, the image sensors are formed on a common semiconductor substrate (e.g., a common silicon image sensor integrated circuit die). Each image sensor may be identical or, if desired, some image sensors may be different (e.g., some image sensors may have different pixel sizes, shapes or sensitivity than other image sensors). For example, each image sensor may be a Video Graphics Array (VGA) sensor with a resolution of 480×640 sensor pixels (as an example). Other types of image sensor may also be used for the image sensors if desired. For example, images sensors with greater than VGA resolution or less than VGA resolution may be used, image sensor arrays in which the image sensors are not all identical may be used, etc.

The use of a camera module with an array of lenses and an array of corresponding image sensors (i.e., an array camera) having associated apertures of various sizes, may allow images to be captured with increased depth-of-field. This is because images captured using a smaller aperture have a larger depth-of-field (DOF) than images captured using larger apertures. Depth-of-field may be defined to be the physical distance between the farthest and nearest objects in a real-world scene that appear in-focus to a viewer of an image of the scene. Providing an array camera with one or more lenses having smaller apertures allows the DOF to be increased relative to that of a conventional single-lens configuration. Cameras having a smaller aperture have a correspondingly larger "F-Number" (F/#) relative to other cameras. Larger F/# (or smaller aperture) leads to less light allowed through the aperture to the image sensor. Array cameras having multiple image sensors associated with multiple lenses and differing aperture sizes may combine the benefits of large and small apertures (or small and large F/#'s, respectively). Large DOF images may be combined with smaller DOF images to produce images with enhanced clarity or to obtain depth information from the images. In comparison with conventional devices, color cross-talk may also be reduced, because a single color filter can be used for each sub-array instead of using a conventional Bayer pattern or other multiple-color color filter array pattern. With a single color filter arrangement of this type, there is no opportunity for color information to bleed from one channel to another. As a result, signal-to-noise ratio and color fidelity may be improved (e.g., having an equal number of green, red and blue image pixels may help avoid an imbalance of green pixels as in a Bayer color filer array). A single color filter arrangement may also allow increased resolution as the pixels of a single image sensor are not subdivided into multiple colors (as in the case of a Bayer color filter array). The color filters that are used for the image sensor pixel arrays in the image sensors may, for example, be red filters, blue filters, and green filters. Each filter may form a color filter layer that covers the image sensor pixel array of a respective image sensor in the array. Other filters such as infrared-blocking filters, filters that block visible light while passing infrared light, ultraviolet-light blocking filters, white color filters, dual-band IR cutoff filters (e.g., dual-band NIR image sensors having filters that allow visible light and a range of infrared light emitted by LED lights), etc. may also be used.

In an array with numerous image sensors, some of the image sensors may have red filters, some may have blue color filters, some may have green color filters, some may have patterned color filters (e.g., Bayer pattern filters, etc.), some may have infrared-blocking filters, some may have ultraviolet light blocking filters, some may be visible-light-blocking-and-infrared-passing filters, etc. The image sensor integrated circuit may have combinations of two or more, three or more, or four or more of these filters or may have filters of only one type.

Processing circuitry 18 (e.g., processing circuitry integrated onto sensor array integrated circuit 16 and/or processing circuitry on one or more associated integrated circuits) can select which digital image data to use in constructing a final image for the user of device 10. For example, circuitry 18 may be used to blend image data from red, blue, and green sensors to produce full-color images, may be used to select an infrared-passing filter sensor when it is desired to produce infrared images, may be used to produce 3-dimensional (sometimes called stereo) images using data from two or more different sensors that have different vantage points when capturing a scene, may be used to produce increased DOF images using data from two or more image sensors with apertures of differing sizes (e.g., differing diameters in circular aperture configurations), etc. In some modes of operation, all of the sensors on array 16 may be active (e.g., when capturing high-quality images). In other modes of operation (e.g., a low-power preview mode), only a subset of the image sensors may be used. Other sensors may be inactivated to conserve power (e.g., their positive power supply voltage terminals may be taken to a ground voltage or other suitable power-down voltage and their control circuits may be inactivated or bypassed).

Figure 2:
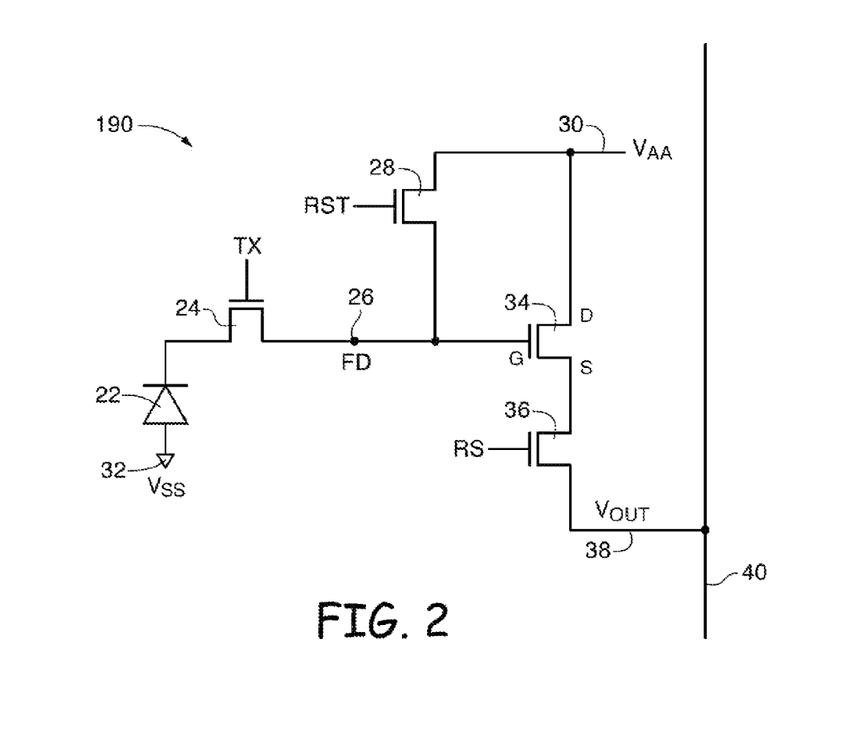
FIG. 2 is a diagram of an illustrative image sensor pixel in accordance with an embodiment of the present invention.

Circuitry in an illustrative pixel of one of the image sensors in sensor array 16 is shown in FIG. 2. As shown in FIG. 2, pixel 190 includes a photosensitive element such as photodiode 22. A positive power supply voltage (e.g., voltage Vaa) may be supplied at positive power supply terminal 30. A ground power supply voltage (e.g., Vss) may be supplied at ground terminal 32. Incoming light is collected by photodiode 22 after passing through a color filter structure. Photodiode 22 converts the light to electrical charge.

Before an image is acquired, reset control signal RST may be asserted. This turns on reset transistor 28 and resets charge storage node 26 (also referred to as floating diffusion FD) to Vaa. The reset control signal RST may then be deasserted to turn off reset transistor 28. After the reset process is complete, transfer gate control signal TX may be asserted to turn on transfer transistor (transfer gate) 24. When transfer transistor 24 is turned on, the charge that has been generated by photodiode 22 in response to incoming light is transferred to charge storage node 26.

Charge storage node 26 may be implemented using a region of doped semiconductor (e.g., a doped silicon region formed in a silicon substrate by ion implantation, impurity diffusion, or other doping techniques). The doped semiconductor region (i.e., the floating diffusion FD) exhibits a capacitance that can be used to store the charge that has been transferred from photodiode 22. The signal associated with the stored charge on node 26 is conveyed to row select transistor 36 by source-follower transistor 34.

When it is desired to read out the value of the stored charge (i.e., the value of the stored charge that is represented by the signal at the source S of transistor 34), row select control signal RS can be asserted. When signal RS is asserted, transistor 36 turns on and a corresponding signal Vout that is representative of the magnitude of the charge on charge storage node 26 is produced on output path 38. In a typical configuration, there are numerous rows and columns of pixels such as pixel 140 in the image sensor pixel array of a given image sensor. A vertical conductive path such as path 40 can be associated with each column of pixels.

When signal RS is asserted in a given row, path 40 can be used to route signal Vout from that row to readout circuitry. If desired, other types of image pixel circuitry may be used to implement the image pixels of sensors 16-1, ... 16-N. For example, each image sensor pixel 140 (see, e.g., FIG. 1) may be a three-transistor pixel, a pin-photodiode pixel with four transistors, a global shutter pixel, a time-of-flight pixel, etc. The circuitry of FIG. 2 is merely illustrative.

Figure 3:
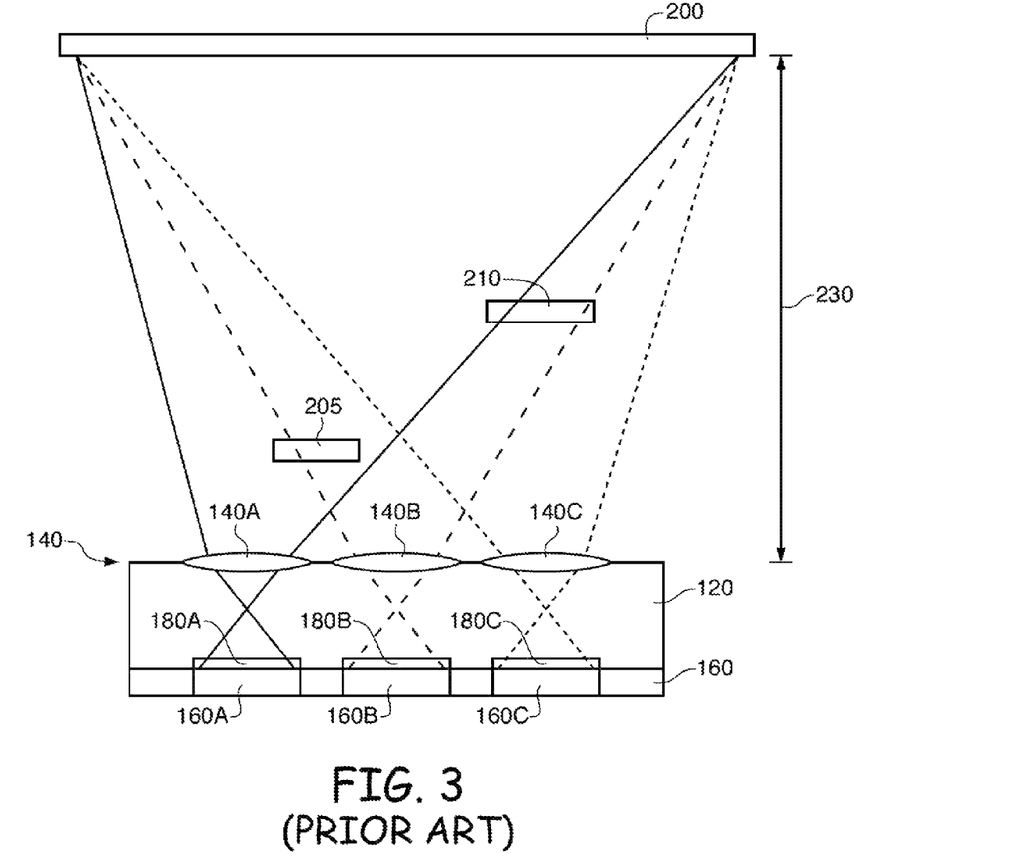
FIG. 3 is a diagram of a conventional camera module arrangement in which the camera module includes an array of lenses and corresponding image sensors.

A diagram of a conventional array camera with an array of identical lenses and corresponding image sensors having apertures of equal size is shown in FIG. 3. In the example of FIG. 3, array camera (camera module 120) has a lens array 140 that is made up of three lenses: lenses 140A, 140B, and 140C. Lenses 140A, 140B, and 140C each focus image light from an objects such as objects, 200, 205, and 210, onto a respective image sensor in image sensor array 160. In particular, lens 140A may be used to focus image light onto image sensor 160A, lens 140B may be used to focus image light onto image sensor 160B, and lens 140C may be used to focus image light onto image sensor 160C. Each image sensor is also associated with a color filter. In a typical arrangement, color filter 180A is a red color filter, color filter 180B is a green color filter, and color filter 180C is a blue color filter. With a camera array of the type shown in FIG. 3, images may only be able to be focused on objects located within a small range of distances from the camera, such as object 210. Images of objects at other distances may be blurred due the limited depth-of-field. Similarly, 3-dimensional depth information may only be obtained from captured images for objects located within a short distance from the camera.

Figure 4:
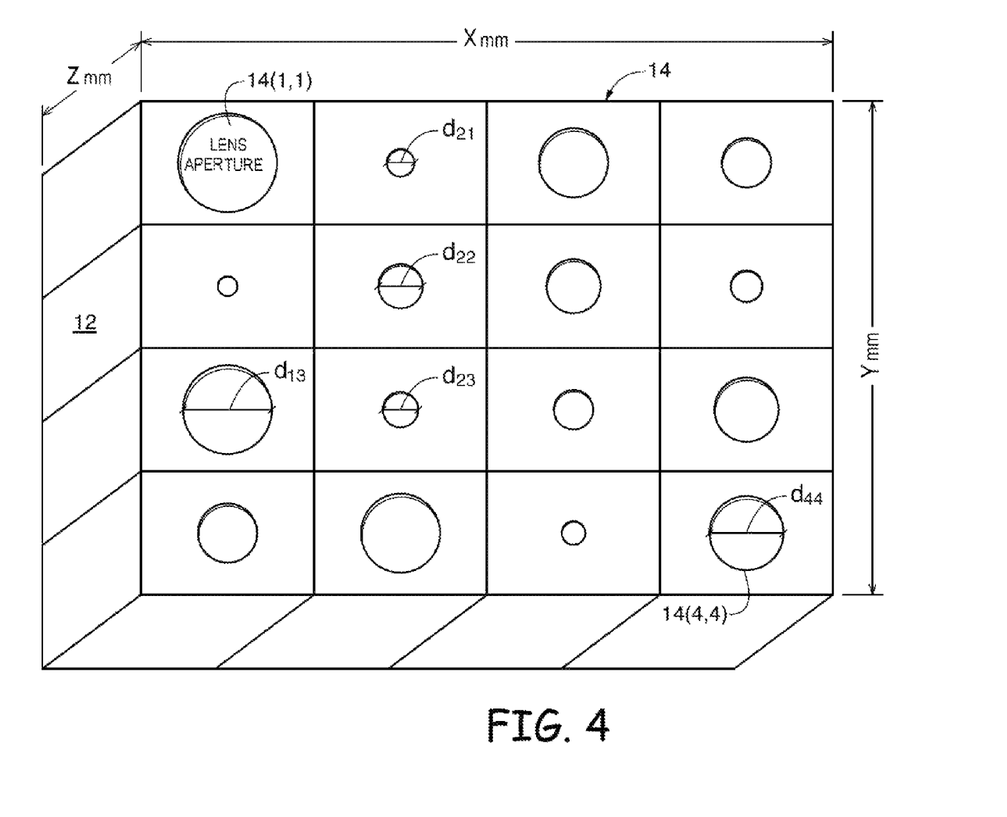
FIG. 4 is a perspective view of an illustrative camera module having an array of apertures of various sizes in accordance with an embodiment of the present invention.

FIG. 4 is a perspective view of an illustrative camera module having an array 14 of apertures (e.g., apertures such as apertures 14(1,1), and 14(4,4)). The array of apertures may, for example, be a rectangular array having rows and columns of apertures. The apertures may all have equal size or may have different sizes. For example, aperture 14(4,4) may have an aperture diameter $d_{44}$ that is the same as or different than aperture diameter $d_{21}$ corresponding to aperture 14(2,1). There may be any suitable number of apertures 14 in the array. In the FIG. 4 example, there are four rows and four columns of apertures.

Figure 5:
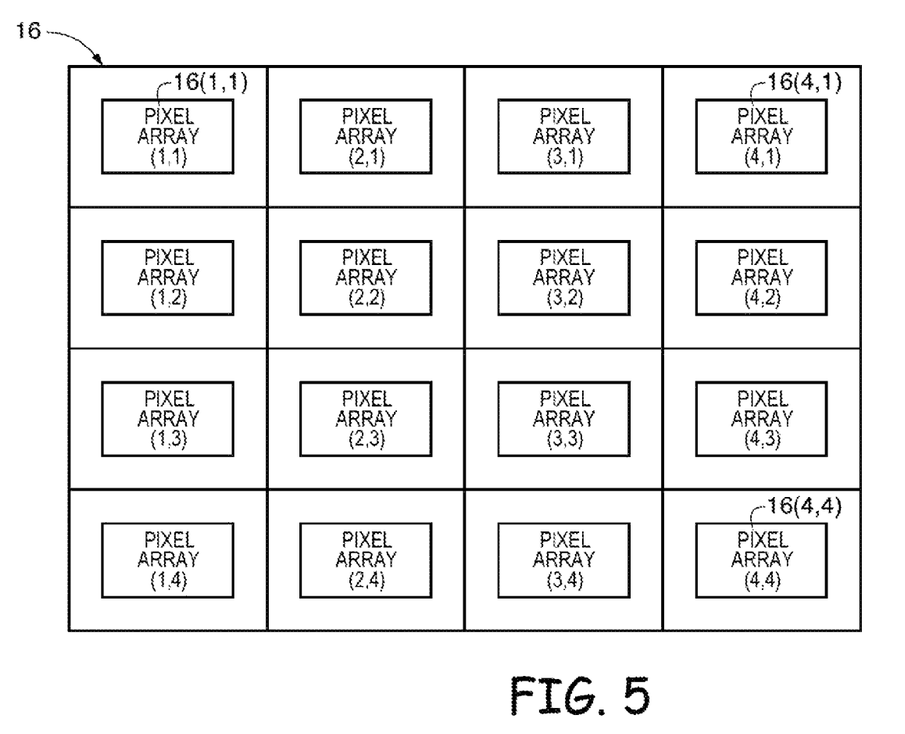
FIG. 5 is a diagram of an illustrative sensor array of the type that may be used with the lens array of FIG. 4 in a camera module in accordance with an embodiment of the present invention.

An illustrative sensor array of the type that may be used with the lens array of FIG. 4 is shown in FIG. 5. As shown in FIG. 5, sensor array 16 may include image sensors such as sensor 16(1,1), 16(4,1), and 16(4,4). The array of FIG. 5 has sixteen image sensors, but, in general, array 16 may have any suitable number of image sensors (e.g., two or more sensors, four or more sensors, ten or more sensors, 20 or more sensors, etc.).

Figure 6:
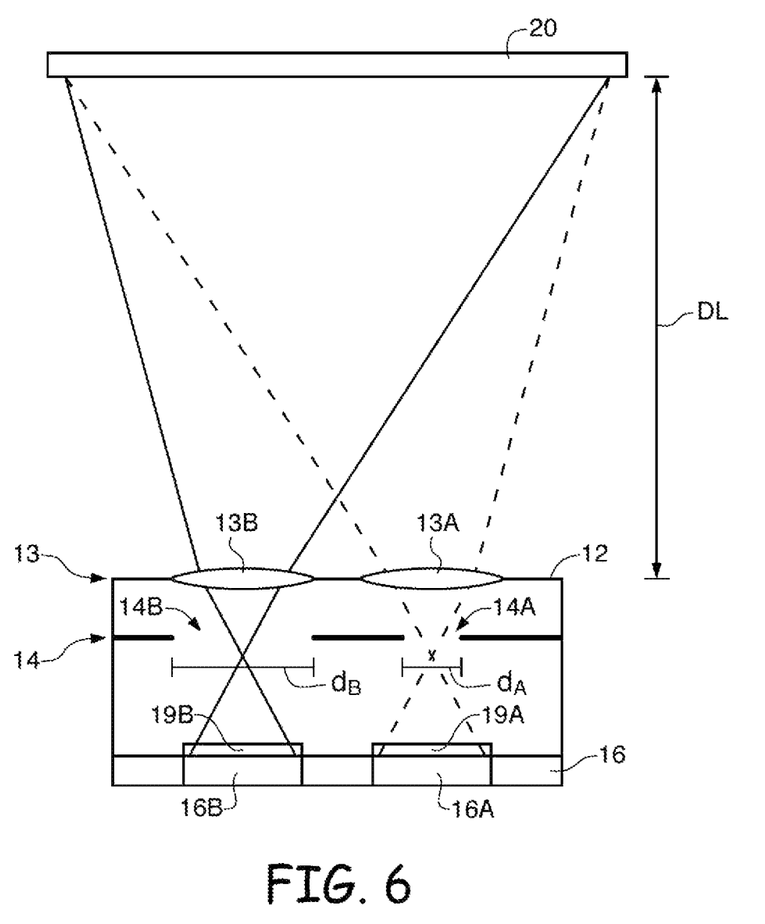
FIG. 6 is a cross-sectional side view of a camera module arrangement in which the camera module includes an array of image sensors, corresponding lenses, and corresponding apertures of differing size in accordance with an embodiment of the present invention.

FIG. 6 is a cross-sectional view of a camera module such as camera module 12 of FIG. 1. As shown in FIG. 6, camera module 12 may be configured such that image sensors receive light through lenses and apertures of the same or differing size. In the illustrative embodiment of FIG. 6, image sensor 16A receives light through lens 13A and aperture 14A. Image sensor 16B receives light through lens 13B and aperture 14B. Image sensor 16A and 16B may be configured to receive light of different colors (i.e., image sensors 16A and 16B may be covered with color filters 19A and 19B respectively). As shown in FIG. 6, apertures 14A and 14B have aperture diameters $d_A$ and $d_B$, respectively. To help increase the depth-of-field of camera module 12, aperture diameter $d_A$ may be smaller than aperture diameter $d_B$. In camera module 12 of FIG. 6, apertures 14A and 14B limit the amount of light reaching image sensors 16A and 16B (i.e., light from a wider range of angles will pass through aperture 14B than will pass through aperture 14A). In this arrangement, image sensor 16A will capture an image with a larger DOF than images captured using image sensor 16B even though lenses 13A and 13B have substantially the same physical size. Images captured using image sensor 16B will have better signal to noise ratio (SNR) than images captured by image sensor 16A due to the larger amount of light allowed through aperture 14B (assuming the same pixel design), as compared with aperture 14A. In some cases, image sensors receiving light through a smaller aperture, such as aperture 14A may include high sensitivity image pixels to compensate for smaller signal (light) levels. Images captured by image sensors 16A and 16B may be combined using processing circuitry such as processing circuitry 18 of FIG. 1. In other embodiments, aperture diameter $d_B$ may be smaller than aperture diameter $d_A$ or may be substantially the same as aperture diameter $d_A$.

Figure 7:
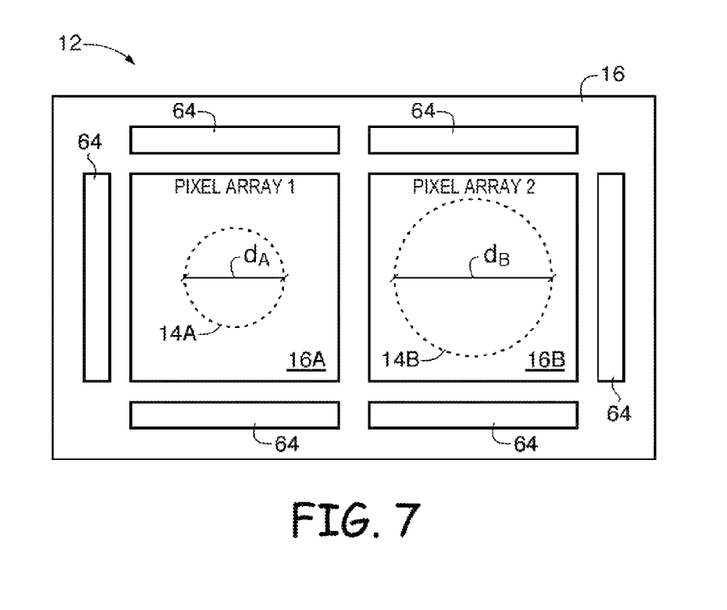
FIG. 7 is a cross-sectional top view of a camera module with a two image sensor array having associated apertures and support circuitry in accordance with an embodiment of the present invention.

FIG. 7 is a cross-sectional top view of an illustrative camera module 12. The image sensor array 16 of FIG. 7 may be formed from a single integrated circuit die (as an example). As shown in the illustrative arrangement of FIG. 7, image sensor array 16 includes (as an example) two image sensor pixel arrays 16A and 16B. Each pixel array may have rows and columns of image pixels such as image pixel 190 of FIG. 2 or other suitable image pixels. Image sensor pixel arrays 16A and 16B may have any suitable resolution (e.g., 640× 480, 1920×1080 etc.).

Image sensor array 16 may also include support circuitry 64 (e.g., row select and control driver circuitry). Support circuitry 64 may be used to issue reset signals, row select signals, etc. for the image sensor pixel arrays. Support circuitry 64 may likewise be used for reading out image sensor data along associated output lines such as output line 40 of FIG. 2).

Using color filters such as color filters 19A and 19B as in FIG. 6, image pixel arrays 16A and 16B may be configured to receive light of various colors. For example, image pixel array 16A may be a near-infrared (NIR) image sensor (i.e., a pixel array that receives light through a filter that blocks visible light while allowing NIR light to pass, thereby gathering near-infrared image data) while image pixel array 16B may be a Bayer image sensor (i.e., a pixel array that receives light through a Bayer color filter). In one suitable arrangement, image sensor 16A may be a NIR image sensor and image sensor 16B may be a Bayer image sensor. This type of arrangement may improve night (or low-light) imaging capabilities or improve image depth estimation (may be aided by using NIR structure lighting) and object recognition in the image captured by the Bayer image sensor. In another embodiment, image sensor 16A may be a clear image sensor (i.e., a non-Bayer image sensor that is free of color filter elements so that its pixel array receives light through clear structures that pass all light or through IR cutoff filters that pass all visible light) and image sensor 16B may be a Bayer image sensor to improve low-light imaging capabilities or to improve image resolution.

In other arrangements in which image sensor 16B is a Bayer image sensor, image sensor 16A may be a dual-band NIR image sensor (i.e., an image sensor having a color filter that allows visible light and a narrow range of infrared light emitted by LED lights), a second Bayer image sensor, or other color image sensor. Other embodiments may include arrangements in which image sensor 16A is a clear image sensor and image sensor 16B is a clear image sensor, a NIR image sensor or a dual-band NIR image sensor for black-and-white, day and night imaging (e.g., for a surveillance camera). In this type of arrangement, aperture diameter $d_A$ of aperture 14A may be chosen to provide a corresponding (as an example) F/# of F/2.8 while aperture 14B may aperture diameter $d_B$ of aperture 14B may be chosen to provide a corresponding with an F/# larger than F/2.8.

Image pixel arrays 16A and 16B may include pixels with single photosensor such as photosensor 22 of FIG. 2 or may include stacked color pixels (i.e., pixels with several photosensors located at various depths in the silicon circuit die). Stacked color pixels may be used to exploit the absorbing properties of silicon to form, e.g., stacked red/blue, stacked red/green/blue, stacked NIR/blue or other stacked pixels in which pixels are located at differing depths below an image sensor surface to provide differing amounts of color filtering (resulting in differing amounts of light of each color reaching the pixels).

As shown in FIG. 7, image pixel arrays 16A and 16B may receive light through apertures 14A and 14B, respectively. Apertures 14A and 14B may have associated aperture diameters $d_A$ and $d_B$, respectively that are different or aperture diameters that are substantially the same.

In one suitable arrangement, image sensor 16A may be a NIR image sensor having a corresponding aperture 14A with an aperture diameter $d_A$. Aperture diameter $d_A$ may be smaller than aperture diameter $d_B$ of aperture 14B. Aperture 14B may be associated with a Bayer image sensor such as image sensor 16B. In an arrangement in which aperture 14A is associated with NIR image sensor 16A, and aperture diameter $d_A$ is smaller than aperture $d_B$, improved night (or low-light) imaging in addition to enhanced depth-of-field and image depth estimation may be achieved. The embodiments described in connection with FIGS. 6 and 7 are merely illustrative and other embodiments may be used.

Figure 8:
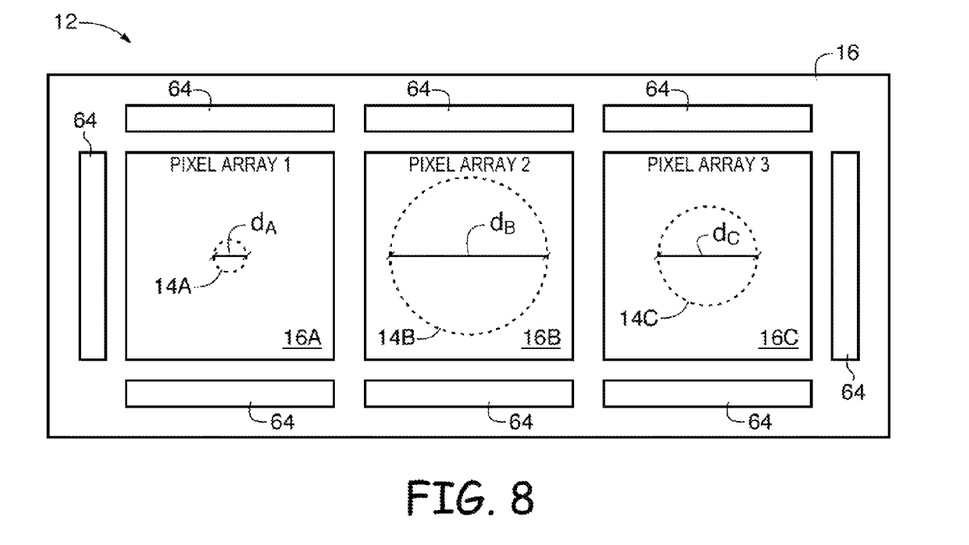
FIG. 8 is a cross-sectional top view of a camera module with a three image sensor array having associated apertures and support circuitry in accordance with an embodiment of the present invention.

FIG. 8 is a cross-sectional top view of another illustrative embodiment of camera module 12. In the embodiment of FIG. 8, camera module 12 includes image sensor array 16 which may be formed from a single integrated circuit die (as an example). As shown in the illustrative arrangement of FIG. 8, image sensor array 16 may include (as an example) three image sensor pixel arrays 16A, 16B, and 16C. Each pixel array may have rows and columns of image pixels such as image pixel 190 of FIG. 2 or other suitable image pixels. Image sensor pixel arrays 16A, 16B, and 16C may have any suitable resolution (e.g., 640×480, etc.).

Image sensor array 16 may also include support circuitry 64 (e.g., row select and control driver circuitry). Support circuitry 64 may be used to issue reset signals, row select signals, etc. for the image sensor pixel arrays. Support circuitry 64 may likewise be used for reading out image sensor data along associated output lines such as output line 40 of FIG. 2).

Various embodiments of camera module 12 may include arrangements in which image sensors 16A, 16B, and 16C may be NIR image sensors, dual-band NIR image sensors, red image sensors, blue image sensors, green image sensors, clear image sensors, Bayer color image sensors, or other color image sensors. Image sensors 16A, 16B, and 16C may include single color pixels and a color filter or may include stacked red/blue (R/B) image pixels or stacked NIR/blue image pixels to form R/B image sensors or NIR/blue image sensors, respectively. Image sensors may be provided with combined single color and stacked image pixels. As an example, image sensor 16A may be a stacked R/B image sensor, image sensor 16B may be a green image sensor, and image sensor 16C may be a NIR image sensor. In another example, image sensor 16A may be a red image sensor, image sensor 16B may be a green image sensor, and image sensor 16C may be a stacked NIR/blue image sensor.

Image sensor 16A, 16B, and 16C may have corresponding apertures 14A, 14B and 14C having aperture diameters $d_A$, $d_B$, and $d_C$, respectively. Aperture diameters $d_A$, $d_B$, and $d_C$ may be substantially the same or may be different. As an example, aperture diameter $d_A$, may be larger than aperture diameter $d_B$, while aperture diameter $d_B$ is equal to aperture diameter $d_C$. In another arrangement aperture diameter $d_A$, may be equal to aperture diameter $d_B$, while aperture diameter $d_B$ is smaller than aperture diameter $d_C$. Other arrangements are possible in which no aperture diameter $d_A$, $d_B$, or $d_C$ is equal to any other.

Figure 9:
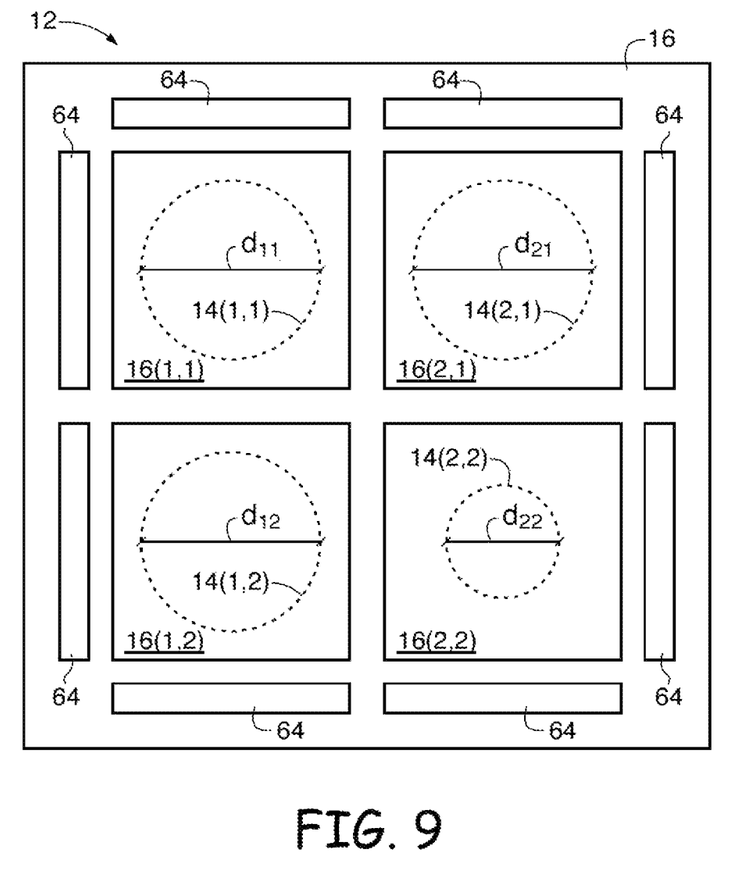
FIG. 9 is a cross-sectional top view of a camera module with a four image sensor array having associated red, green, blue and NIR image sensors, associated apertures, and support circuitry in accordance with an embodiment of the present invention.

FIG. 9 is a cross-sectional top view of another illustrative embodiment of camera module 12. In the embodiment of FIG. 9, camera module 12 includes image sensor array 16 which may be formed from a single integrated circuit die (as an example). As shown in the illustrative arrangement of FIG. 9, image sensor array 16 may include (as an example) four image sensor pixel arrays 16(1,1), 16(2,2), 16(1,2), and 16(2,1). Each pixel array may have rows and columns of image pixels such as image pixel 190 of FIG. 2 or other suitable image pixels. Image sensor pixel arrays 16(1,1), 16(2,2), 16(1,2), and 16(2,1) may have any suitable resolution (e.g., 640×480, etc.).

Image sensor array 16 may also include support circuitry 64 (e.g., row select and control driver circuitry). Support circuitry 64 may be used to issue reset signals, row select signals, etc. for the image sensor pixel arrays. Support circuitry 64 may likewise be used for reading out image sensor data along associated output lines such as output line 40 of FIG. 2).

In the illustrative embodiment of FIG. 9, image pixel array 16(1,1) is a red image sensor (i.e., an array of image pixels that receive incident light through a filter than allows passage of red light and blocks other colors). Image pixel array 16(1,2) may be a blue image sensor, image pixel array 16(2,1) may be a green image sensor and image pixel array 16(2,2) may be a NIR image sensor. Image sensors 16(1,1), 16(1,2), and 16(2,1) may have associated aperture diameters $d_{11}$, $d_{12}$, and $d_{21}$ respectively that are all substantially the same. Providing image sensors 16(2,2), 16(1,2), and 16(2,1) with aperture diameters $d_{11}$, $d_{12}$, and $d_{21}$ respectively that are all substantially the same allows combination of the images captured by image sensors 16(2,2), 16(1,2), and 16(2,1) into a single color image using processing circuitry such as processing circuitry 18 of FIG. 1. In order to provide a larger DOF and enhanced depth information, NIR image sensor 16(2,2) may have an associated aperture diameter $d_{22}$ that is smaller than aperture diameters $d_{11}$, $d_{12}$, and $d_{21}$.

Processing circuitry 18 may also be used to combine images captures by image sensors 16(1,1), 16(2,2), 16(1,2), and 16(2,1) into a color image with enhanced low-light representation (due to inclusion of a NIR image). Images captured by image sensors 16 may also provide enhanced depth-of-field and may provide enhanced data for depth estimation.

Various embodiments have been described illustrating array cameras that include arrays of image sensors, lenses and apertures having apertures of various size. Array cameras may include image sensors sensitive to varying combinations of colors of light including NIR light. Apertures associated with the image sensors of varying color sensitivity may have aperture diameters of varying size to enhance the DOF in captured images, to improve image signal-to-noise-ratio, to provide enhanced clarity images, to capture improved data for depth estimation of objects in a scene, etc. Processing circuitry may be used to process images captured by different image sensors to form a composite color image, a stereoscopic image, a low (or night) light image or to extract depth information about a scene.

The foregoing is merely illustrative of the principles of this invention which can be practiced in other embodiments.

What is claimed is:

1. A camera module, comprising:
   an array of lenses;
   an array of corresponding apertures having associated aperture sizes; and
   an array of corresponding images sensors each of which receives image light from a corresponding one of the lenses through a corresponding one of the apertures, wherein at least two apertures in the array of apertures have different sizes and wherein the array of corresponding apertures is interposed between the array of lenses and the array of corresponding image sensors.

2. The camera module defined in claim 1, wherein the camera module comprises first and second image sensors in the array of image sensors and associated first and second apertures in the array of apertures, wherein the first and second apertures have first and second respective aperture diameters, and wherein the second aperture diameter is smaller than the first aperture diameter.

3. The camera module defined in claim 2, wherein the first and second image sensors are Bayer image sensors.

4. The camera module defined in claim 2, wherein the first image sensor is a Bayer image sensor, and wherein the second image sensor is a clear image sensor.

5. The camera module defined in claim 1, wherein the array of image sensors comprises first, second, and third image sensors, wherein the array of apertures includes first, second and third apertures, wherein the first, second, and third apertures have first, second, and third respective aperture diameters, and wherein the first aperture diameter is smaller than the second aperture diameter.

6. A camera module, comprising:
   an array of lenses; and
   an array of corresponding image sensors each of which receives image light from a corresponding one of the lenses, wherein the array of image sensors includes at least one near-infrared image sensor and at least one stacked pixel image sensor having image pixels each with multiple photosensors located at differing depths within a silicon circuit die to provide differing amounts of color filtering for the multiple photosensors.

7. The camera module defined in claim 6, wherein the array of lenses comprises at least two lenses.

8. The camera module defined in claim 7, wherein the array of corresponding image sensors further comprises a Bayer image sensor.

9. The camera module defined in claim 7, wherein the array of corresponding image sensors further comprises a clear image sensor.

10. The camera module defined in claim 7, wherein the array of lenses further comprises a third lens, and wherein the array of corresponding image sensors further comprises a third image sensor.

11. The camera module defined in claim 10, wherein the stacked pixel image sensor is a stacked red/blue image sensor and wherein the third image sensor is a green image sensor.

12. The camera module defined in claim 10, wherein the third image sensor is a red image sensor and wherein the stacked pixel image sensor is a stacked near-infrared/blue image sensor.

13. The camera module defined in claim 6, wherein the near-infrared image sensor is a dual-band NIR image sensor.

14. A camera module, comprising:
   an array of lenses;
   an array of corresponding apertures having associated aperture diameters, wherein the aperture diameters for at least two of the apertures in the array of apertures are different; and
   an array of corresponding images sensors each of which receives image light that has passed through a corresponding one of the apertures after passing through a corresponding one of the lenses, wherein the array of image sensors includes at least one near-infrared image sensor that gathers near-infrared image data.

15. The camera module defined in claim 14, wherein the image sensors are formed as part of a common image sensor integrated circuit die.

16. The camera module defined in claim 15, wherein the array of image sensors comprises first and second image sensors, wherein the array of apertures comprises first and second apertures, wherein the first and second apertures have first and second respective aperture diameters, wherein the second aperture diameter is different from the first aperture diameter, and wherein the first image sensor is configured to receive at least near-infrared light and the second image sensor is a Bayer image sensor.

17. The camera module defined in claim 15, wherein the array of image sensors comprises first and second image sensors, wherein the array of apertures comprises first and second apertures, wherein the first and second apertures have first and second respective aperture diameters, wherein the second aperture diameter is different from the first aperture diameter, wherein the first image sensor is configured to receive at least near-infrared light, and wherein the second image sensor is a clear image sensor.

18. The camera module defined in claim 15, wherein the camera module comprises first, second, and third image sensors and associated first, second and third apertures, wherein the first, second, and third apertures have associated first, second, and third aperture diameters, wherein the first aperture diameter is different from the second aperture diameter, wherein the first image sensor is a near-infrared image sensor, wherein the second image sensor is a stacked red-blue image sensor in which pixels are located at differing depths below an image sensor surface to provide differing amounts of color filtering, and wherein the third image sensor is a green image sensor.

19. The camera module defined in claim 15, wherein the camera module comprises first, second, and third image sensors and associated first, second and third apertures, wherein the first, second, and third apertures have associated first, second, and third aperture diameters, wherein the third aperture diameter is different from the first aperture diameter, wherein the first image sensor is a red image sensor, wherein the second image sensor is a green image sensor, and wherein the third image sensor is a stacked near-infrared/blue image sensor in which pixels are located at differing depths below an image sensor surface to provide differing amounts of color filtering.

20. The camera module defined in claim 15, wherein the camera module comprises first, second, third, and fourth image sensors and associated first, second, third, and fourth apertures, wherein the first, second, third, and fourth apertures have associated first, second, third, and fourth aperture diameters, wherein the fourth aperture diameter is different from the first, second, and third aperture diameters, wherein the first, second, and third aperture diameters are equal, wherein the first image sensor is a red image sensor, wherein the second image sensor is a green image sensor, wherein third image sensor is a blue image sensor, and wherein the fourth image sensor is a near-infrared image sensor.

* * * * *